United States Patent [19]

Tenniswood

[11] 4,129,277
[45] Dec. 12, 1978

[54] RETRACTABLE ROLLER SUPPORT FOR USE WITH FLEXIBLE ROLLING SUPPORT FOR CONDUCTORS OR CONDUITS

[75] Inventor: David M. Tenniswood, Troy, Mich.

[73] Assignee: McGraw-Edison Company, Elgin, Ill.

[21] Appl. No.: 765,934

[22] Filed: Feb. 7, 1977

[51] Int. Cl.² .............................................. H02G 11/00
[52] U.S. Cl. ................................... 248/51; 191/12 C; 248/49; 248/55
[58] Field of Search ....................... 248/49, 51, 52, 55, 248/80; 59/78.1; 191/12 C, 12 R; 254/193; 137/355.16, 355.17, 355.22

[56] References Cited

U.S. PATENT DOCUMENTS

| 927,969 | 7/1909 | Henry | 254/193 |
|---|---|---|---|
| 2,816,734 | 12/1957 | Crofoot | 254/193 |
| 2,864,907 | 12/1958 | Waninger | 59/78.1 X |
| 3,024,325 | 3/1962 | Waninger | 191/12 C |
| 3,157,376 | 11/1964 | Merker et al. | 248/49 |
| 3,291,921 | 12/1966 | Waninger | 191/12 C |
| 3,860,027 | 1/1975 | McCain et al. | 191/12 R X |
| 3,994,373 | 11/1976 | Loos et al. | 248/52 X |

FOREIGN PATENT DOCUMENTS

269694  11/1963  Australia .................. 191/12 C

Primary Examiner—Rodney H. Bonck
Attorney, Agent, or Firm—Jon Carl Gealow; Thomas E. McDonald; Ronald J. LaPorte

[57] ABSTRACT

The effective movement range of a rolling support such as a flexible chain linkage for electrical conductors and/or fluid conduits is materially increased by the provision of one or more retractable roller supports for the elevated cantilevered section of the rolling support upstream from its lower anchored end. The retractable roller support allows the rolling loop portion of the rolling support to pass through the retractable roller support in either direction. The weight of the rolling support is utilized to bias the retractable roller support toward its active supporting position.

17 Claims, 6 Drawing Figures

FIG.4
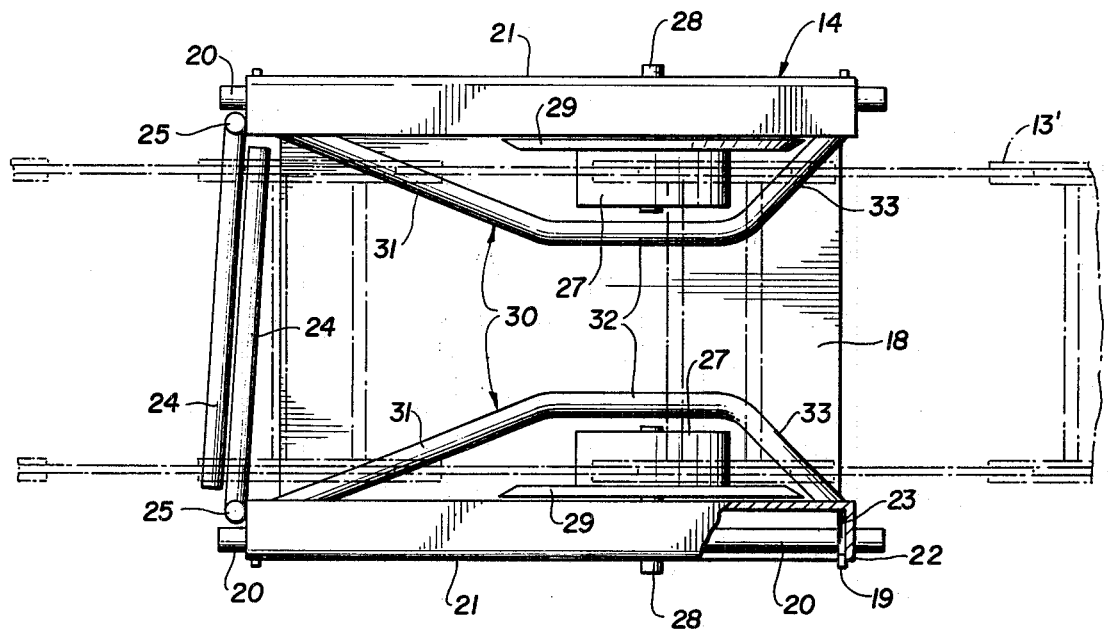
FIG.5
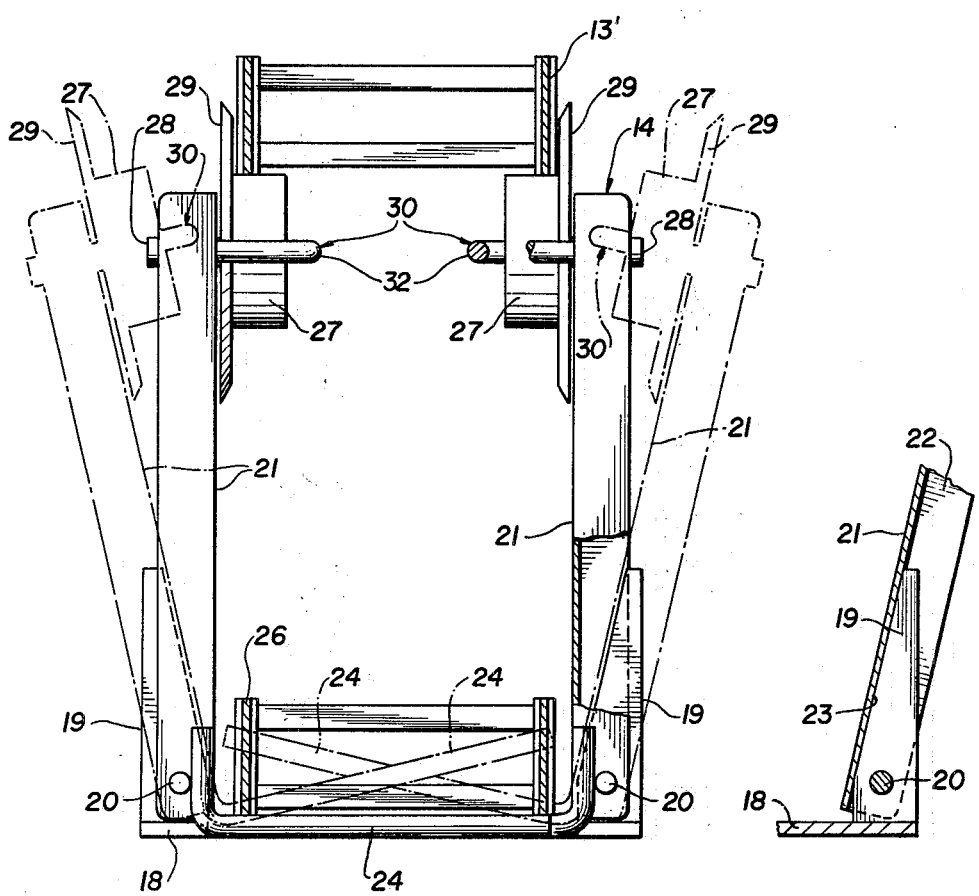
FIG.6

RETRACTABLE ROLLER SUPPORT FOR USE WITH FLEXIBLE ROLLING SUPPORT FOR CONDUCTORS OR CONDUITS

BACKGROUND OF THE INVENTION

The invention relates to improvements in rolling supports for flexible conductors and fluid conduits of the general type disclosed in U.S. Pat. Nos. 2,864,907, 2,975,807, 3,053,358, 3,590,854, 3,716,986, and others and roller supports therefor where the object is to support, guide and protect electric, hydraulic, pneumatic, coolant and the like, conductors which extend between parts of machines that move relative to each other on tracks.

In such rolling supports, one end of the support composed of chain links is fixedly anchored and the opposite end of the support is attached to the moving instrumentality which travels back and forth on a linear path. As the instrumentality advances forwardly in relation to the anchored end of the rolling support, its movement range is limited by the ability of the unsupported cantilevered section of the rolling support to be self-supporting. The unsupported length can be increased by use of high strength materials, larger link assembly, etc.; however, there is always a limit to each case generally determined by manufacturing costs, maintenance costs, serviceability, etc.

Stationary roller supports can be used to extend the maximum travel of the rolling support by spacing one or more of such supports downstream of the fixedly anchored end of the rolling support. However, such supports cannot be placed upstream of the fixedly anchored end of the rolling support, because of the interference that would result between the rolling radius and the roller support, i.e., the rolling radius cannot pass through the roller support unless some means are provided for movement of the rollers and their associated supporting arms clear of the rolling radius.

An arrangement is also known according to which both reaches of the rolling support are horizontal and are movable on two parallel tracks which are arranged adjacent to each other in an approximately horizontal plane, the medium distance between the tracks corresponding to the smallest diameter of curvature of the chain. In such arrangements, the spaced portions of the chain are provided with rollers which ride on the tracks.

The heretofore known supporting arrangements are, in part, rather expensive and complicated.

Accordingly, it is an object of the present invention to provide a rolling support and roller support therefor which will overcome the aforementioned disadvantages.

It is another object of the present invention to provide a rolling support and roller support therefor which is of simple construction and which permits the employment of flexible rolling supports in any desired length.

It is a further object of this invention to provide an improved rolling support means in the form of a retractable roller support for supporting the cantilevered portion of a rolling support for cables or conduits in a manner which will materially increase the effective movement range of the rolling support.

These and other objects and advantages of the invention will appear more clearly from the following specification, particularly when considered in connection with the accompanying drawings.

SUMMARY OF THE INVENTION

A retractable roller support for the cantilevered portion of a rolling chain link support embodies a mounting base placed upstream from the anchored end of the lower section of the rolling support. The retractable roller support has a pair of opposed sides which are pivoted adjacent their lower ends to the mounting base and which have return arms or bars secured to their lower ends and extending transversely beneath the lower section of the rolling support to be weighted down thereby for biasing the upstanding sides of the retractable roller support toward their active supporting positions. Opposing support devices or rollers for the cantilevered section of the rolling support are freely journaled on the upper portions of said sides. These rollers, which also might be low friction pads, are caged within contoured cam bars or rods which may be engaged by the rolling loop portion of the rolling support as it travels through the roller support to retract or spread apart the sides of the roller support, so that the roller loop may pass entirely through the retractable roller support in either direction. Positive stop means limits the outward retractive movement of the support rollers and the pivoted sides on which they are mounted.

For purpose of orientation, the terms "upstream" and "downstream" are used herein to define the position of the roller support or its direction of movement with respect to a fixed reference position. The fixed reference position is taken to be the lower anchored end of the rolling support. Upstream is to the left of the fixed anchored end, as shown by the phantom line representation in FIG. 3, and downstream is to the right of the fixed anchored end, in the direction of the arrow as shown in FIG. 1.

BRIEF DESCRIPTION OF THE DRAWINGS

FIG. 4 is a plan view of the retractable roller support.

FIG. 5 is an end elevation of the retractable roller support, partly broken away, with the flexible rolling support shown in section and with the roller support shown retracted in phantom lines.

FIG. 6 is an enlarged fragmentary vertical cross section through the retractable roller support showing positive stop means to limit retractive movement of the pivoted sides of the support.

DESCRIPTION OF THE PREFERRED EMBODIMENT

Figure 2:
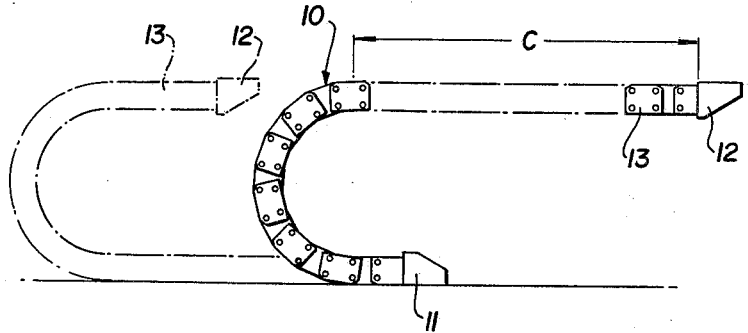
FIG. 2 is a partly schematic side elevation of a conventional flexible rolling support arrangement according to the prior art with a restricted movement range.

Referring now to the drawings, like numerals designate like parts throughout the several views. FIG. 2 illustratively shows a conventional flexible rolling support. The numeral 10 designates a flexible chain linkage for electrical conductors, hoses or other conduits of the class shown in the above-referenced U.S. Pat. Nos. 3,716,986 and 3,590,854. The rolling support 10 has a fixed or anchored end terminal 11 and a moving end terminal 12. The end terminal 12 of the upper cantilevered section 13 of the rolling support 10 has a total movement range with an instrumentality connected to the end terminal 12 limited by the maximum feasible length C of the cantilevered support section 13. By means of the invention herein, the movement range of a rolling support 10', shown in FIG. 3, has been materially increased. This increased movement range is achieved by increasing the length of the unsupported or cantilevered section 13' of the rolling support to the dimension C' and providing retractable roller support means for the antilevered section upstream of the anchored end 11.

Figure 3:
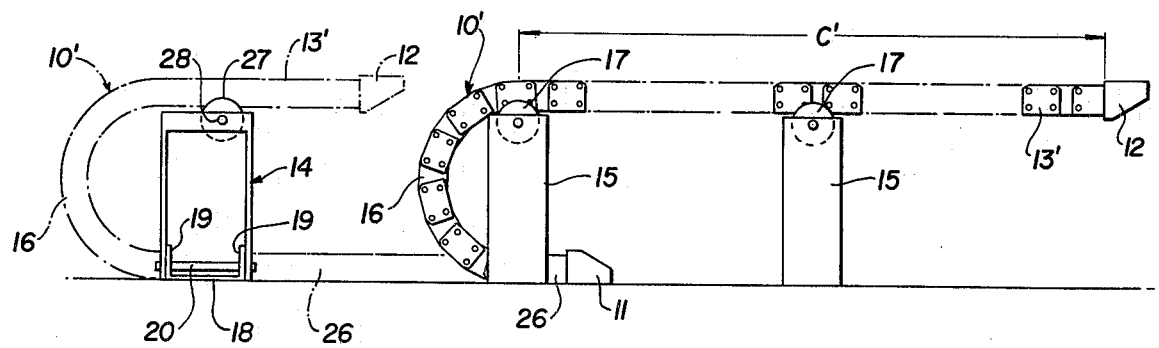
FIG. 3 is a partly schematic side elevation of a rolling support utilizing the retractable roller support of the present invention resulting in an extended movement range for the rolling support and showing the use of additional stationary roller supports for added support.

More particularly, the flexible rolling support 10' having increased movement range by virtue of the invention employs one or more retractable roller supports 14 or units upstream of the fixed terminal 11. One or more non-retractable roller supports 15 may be employed further downstream, as shown in FIG. 3, in conjunction with the retractable roller supports 14. As will be fully described, each retractable support 14 responds automatically to the pass of the rolling loop section 16 of rolling support 10' as the loop passes through the support causing the arms of the support to retract or spread laterally to allow the rolling loop portion to pass in either direction completely therethrough. That is, the loop portion may be displaced beyond the retractable support toward a fully extended position of the support, as depicted in phantom lines in FIG. 3 or to a fully withdrawn position, as depicted by the full lines in FIG. 3. In the withdrawn position of the rolling support 10', a required number of non-retractable roller supports 15 are utilized in spaced relation to lend adequate support to the cantilevered section 13' of increased length C'. One non-retractable roller support 15 may be placed close to the fixed end terminal 11 of the rolling support 10', as shown in FIG. 3, and another non-retractable support or supports 15 are arranged further downstream so that their roller means 17 may lend support to the cantilevered section 13', as required by the particular dimension C'.

In one illustrative embodiment of the invention, the total travel of the rolling support equals 120 feet, twice the distance C' from the axis of the non-retractable roller support closest to the fixed end terminal 11 to the end terminal 12. Non-retractable supports 15 are advantageously mounted on 20-foot centers.

Figure 1:
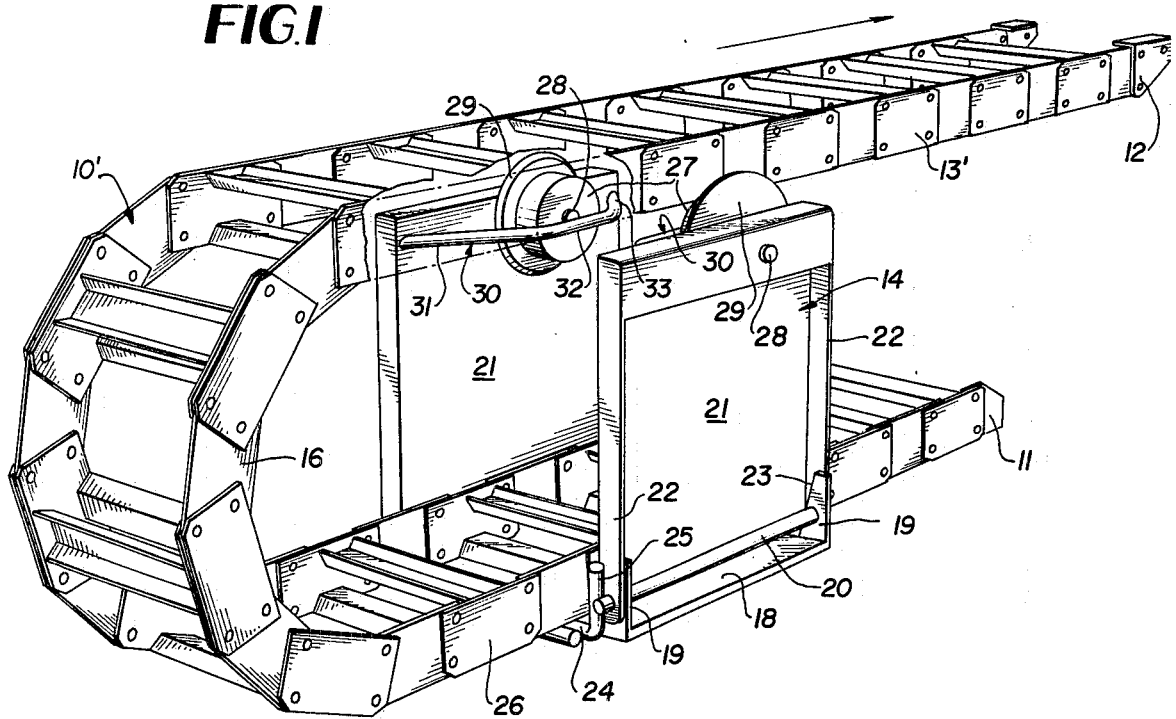
FIG. 1 is a perspective view of a retractable roller support for a flexible rolling support embodying the present invention.

As best shown in FIGS. 1, 4 and 5, the retractable roller support 14 embodying the essence of the invention comprises an essentially flat horizontal mounting base 18 adapted to rest on a solid level support surface, such as a concrete floor. Pairs of rigid upstanding bearing plates 19 rise from opposite sides of the mounting base 18 at its upstream and downstream ends. These bearings plates 19 at each side of the support 14 have aligned apertures for the rotatable reception and support of rocker shafts 20 carried by two opposing side walls 21 of the retractable support. Preferably, the rocker shafts 20 are fixed to the side walls 21 near their lower ends as by welding and end portions of the shafts 20 extend through apertured flanges 22 on each side wall 21, said flanges projecting outwardly, as shown. The flanges 22 lie outwardly of the upstanding bearing plates 19. The bearing plates have inclined interior edges 23 which abut the outer faces of the side walls 21 when the latter swing outwardly around the axes of the rocker shafts 20 (as shown in FIGS. 5 and 6) and thus positively limit the retractive or spreading movement of the two sides of the retractable roller support 14.

At the upstream end of the support 14, a transversely inwardly extending return arm or rod 24 is rigidly attached to each side wall 21, as by welding a short upstanding extension 25 of the return arm to the adjacent flange 22 of the side wall. The return arms 24 attached to the two side walls 21 extend in opposite directions across or transversely of the retractable support in parallel relation as best shown in FIG. 4. The two arms 24 are slightly spaced and they are generally perpendicular to the longitudinal axis of the rolling support 10', although they may be at a slight angle to this axis as shown in FIG. 4. The two return arms 24 are adapted to lie below the bottom section 26 of the rolling support 10' which bottom section extends from the anchored terminal 11. In this manner, the bottom section 26 of the rolling support 10' rests directly on the mounting base 10 and the two return arms 24 and the weight of the rolling support is borne by these elements 24 and 18, as will be further discussed. It should be understood in view of the foregoing description that each side wall 21 forms a pivoted or rockable unit with one of the return arms 24 and the associated rocker shaft 20. This pivoted or rockable unit may turn at proper times on the longitudinal axis of the shaft 20 which rotates in the supporting bearing plates 19.

A support roller 29 is mounted near the top of each side wall 21 of the retractable support 14. Support rollers 29 form a pair of opposed co-axial support rollers 27 which are freely and rotatably mounted on the side walls 21 through supporting transversely extending axis stub shafts 28 fixedly secured to the side walls 21, preferably near their forward upper corners. The cylindrical bodies of the rollers 27 engage beneath and support the movable cantilevered upper section 13' of the rolling support 10 when the support 14 is in an active or closed position, as shown in full lines in FIG. 5. The support rollers 27 have outer side flanges 29 of considerably enlarged diameters compared to the cylindrical bodies of the rollers to assure stability and lateral guidance of the moving section 13' through the retractable support. It should be understood that the two support rollers 27 are bodily carried independently on the two rockable side walls 21 of the retractable support 14.

Each retractable roller support 14 includes a pair of spaced horizontal opposing safety or cam bars 30 mounted on the inner face of two side walls 21 at an elevation approximately corresponding to that of the coaxial stub shafts 28. The cam bars 30 have their opposite ends affixed to the interiors of the side walls 21 by welding or the like so that the cam bars are rigid with the side walls. The cam bars 30 have converging entrance portions 31 of equal length and arranged symmetrically on opposite sides of the longitudinal axis of the support 14 and rolling support 10'. The converging sections 31 of the cam bars are upstream from the rollers 27 and the cam bars are below the supporting top peripheral faces of the two rollers 27, as best shown in FIG. 5.

The cam bars 30 include spaced parallel longitudinal sections 32 immediately adjacent the interior sides of the support rollers 27, and downstream from these rollers, the cam bars include divergent end sections 33. It may be noted in FIGS. 4 and 5 that the two safety or cam bars 30 extend around and effectively cage the support rollers 27 so that they cannot be contacted fore or aft or at their interior sides by the rolling loop 16 of the rolling support 10.

Depending upon the overall length of the flexible rolling support 10', one or more of the retractable supports 14 is placed upstream from the fixed terminal 11 and a suitable number of the non-retractable roller supports 15 may be used downstream from the retractable support 14, as illustrated in FIG. 3.

The retractable support 14 need not be fixedly anchored to the underlying support surface, such as a floor, and the mounting base 18 may rest freely on the floor and will be held down firmly by the weight of the lower section 26 of the rolling support. The weight of this lower section 26 is also borne by the oppositely extending return arms 24 which serve to return the two sides of the retractable support to their vertical active supporting positions whenever the bottom section 26 rests upon them.

Assuming that the retractable support 14 is actively positioned relative to the rolling support 10', as shown in FIG. 1, and that the rolling support is being drawn in the direction of the arrow, operation of the retracting means of the retractable support will be described. The rolling loop 16 will eventually be displaced to the point where two sides of a chain link will engage the converging sections 31 of cam bars 30. This action will force the two side walls 21 and the associated support rollers 27 to retract or spread toward their outer positions shown in broken lines in FIG. 5. Substantially simultaneously or just prior to the chain link engagement with the converging sections 31 of cam bars 30, the bottom section 26 no longer bears upon the return arms 24 so that the side walls 21 may pivot about shafts 20 causing arms 24 to assume their crossing inclined positions, as shown in FIG. 4, as the full retraction of the roller support 14 takes place. The side walls 21 and rollers 27 will remain by gravity in the fully retracted or separated positions after the rolling loop 16 has passed through the support 14 in one direction. Outward swinging movement of the two side walls 21 is positively limited through contact of the side walls 21 with the inclined edges 23 of fixed bearings plates 19, as best shown in FIG. 6. The shafts 20 may also take the form of torsion bars which are secured at one end, either upstream or downstream, to the flanges 22 and at the other end to bearing plate 19 so as to provide a spring force which will retract or spread the side walls to their outer positions as shown in broken lines in FIG. 5 when the bottom section 26 no longer bears upon the return arms 24. With the shafts 20 taking the form of torsion bars, the relative upstream-downstream positions of return arms 24 and converging sections 31 of cam bars 30 is such that bottom section 26 is lifted from return arms 24 to permit the side walls to retract under the force of torsion bars 20 prior to the engagement of the chain link with the converging sections 31 of cam bars 30. In this form of construction the cam bars 30 are provided as a safety feature to insure retraction of side walls 21 should they fail to open for some reason under the force of torsion springs 20. In still another embodiment of this invention the spring force provided by the torsion bars may instead be provided by coil springs extending from the side walls to the base so as to provide tension forces tending to retract or spread the side walls.

Assuming the rolling loop 16 is moving in the opposite direction due to return travel of the terminal 12 with a reciprocating instrumentality, operation of the engaging means of the retractable support will be described. The loop can pass freely between the cam bars 30 and rollers 27 from the downstream end of the support 14, and when the lower section 26 of the rolling support again bears down on the return arms 24, the latter are forced to descend to their original horizontal positions against the supporting floor or surface and the side walls 21 and supporting rollers 27 are likewise positively returned to supportive engagement with the upper cantilevered section 13' of the rolling support. Should the rollers 27 be in the closed or active position as the rolling loop approaches, the forward edge of the chain links of the loop will engage divergent end sections 33 of the safety bars 30 to cause the side walls 21 to be retracted prior to engagement of the lower section and the oppositely extending return arms. The retractable support 14 will thus permit passage of the rolling support 10' through it in either direction.

The retractable support is characterized by extreme simplicity and positive action directly in response to movement of the rolling support 10'. No pneumatic, hydraulic or electrical controls are required to operate the retractable roller supports.

It may now be seen that, by providing one or more retractable supports 14 embodying the invention in the described manner, the effective movement range of the rolling support 10' can be significantly increased over the usual movement range otherwise obtainable.

It should be apparent to those skilled in the art, that while what has been described is considered at the present to be the preferred embodiment of this invention, in accordance with the present statutes, changes may be made in the disclosed retractable roller support without actually departing from the true spirit and scope of this invention.

What is claimed as new and is desired to be secured as Letters Patent of the United States is:

1. In a reciprocable flexible rolling support having anchored and moving ends, a rolling loop joined at one end to the anchored end and at its other end to one end of a cantilevered section, the other end of which is joined to said moving end, the improvement comprising a retractable roller support means disposed in the path of movement of the rolling support for supporting said cantilevered section comprising a mounting base, sides rising from the mounting base on opposite sides of the rolling support and being pivoted to the mounting base on pivot axes substantially parallel to the path of movement of the rolling support, support rollers for said cantilevered section on said sides disposed substantially above said mounting base, camming means on said sides in the path of movement of said rolling loop and adapted to be engaged by said loop to pivot said sides about their axes and retract said support rollers such that said rolling loop may pass through the retractable roller support and means on said sides engageable with said rolling support and operable to return said sides from their retracted positions to an active supporting position in relation to said cantilevered section of said rolling support.

2. In a flexible rolling support as defined in claim 1, further including positive stop means on said mounting base for engaging said pivoted sides during their pivotal movement away from said rolling support and positively limiting such movement.

3. In a flexible rolling support as defined in claim 1, wherein said camming means comprises a cam element on the interior of each side including an angled end portion, a longitudinal intermediate portion and another angled end portion.

4. In a flexible rolling support as defined in claim 1, wherein said camming means comprises a pair of spaced opposing cam bars on the interiors of said sides and having converging opposite end portions and intermediate parallel portions.

5. In a flexible rolling support as defined in claim 4, wherein said cam bars are substantially horizontal and substantially at the elevation of said support rollers and extending around the interior sides of the support rollers, said parellel portions of the cam bars being adjacent to the interior sides of the rollers.

6. In a flexible rolling support as defined in claim 1, wherein said means on said sides operable to return said sides comprises a pair of oppositely extending return bars projecting inwardly of said sides and transverse to the path of movement of said rolling support.

7. In a flexible rolling support as defined in claim 1, further including bearing members on said mounting base adjacent the opposite sides and each end of said sides, rocker shafts carried by said sides and journaled on said bearing members, and said bearing members having inclined interior faces in the paths of movement of said sides and serving as positive stops to limit outward pivoting of said sides around the axes of said rocker shafts.

8. A retractable roller support for use with a flexible rolling support for electrical conductors, fluid conduits and the like, comprising a mounting base, spaced opposed upstanding sides rising from the mounting base and pivoted to the mounting base adjacent opposite sides thereof on substantially parallel pivot axes, support rollers mounted on said opposed sides adjacent the tops thereof, camming means on said sides disposed above the mounting base for spreading said sides and rollers by pivoting them on said pivot axes upon engagement by a rolling support passing between said sides and oppositely extending return arms fixedly secured to said sides and being bodily movable therewith, said arms extending transverse to said pivot axes.

9. A retractable roller support as defined in claim 8, wherein said camming means comprises a pair of cam bars on the interiors of said sides adjacent to said support rollers and extending around the interior sides of the support rollers and having angled entrance and exit sections which converge toward intermediate parallel portions adjacent to said rollers.

10. A retractable roller support as defined in claim 8, wherein said return arms are secured to said sides substantially at the bottoms of the sides and adjacent the level of the mounting base means, whereby a rolling support may engage and rest on said return arms.

11. A retractable roller support as defined in claim 8, further including positive stop means associated with said sides to limit outward pivotal movement thereof.

12. In a reciprocal flexible rolling support having anchored and moving ends, a rolling loop joined at one end to the anchored end and at its other end to one end of a cantilevered section, the other end of which is joined to said moving end, the improvement comprising a retractable support means disposed in the path of movement of the rolling support for supporting said cantilevered section comprising a mounting base means, sides rising from said mounting base means on opposite sides of the rolling support and being pivoted on said mounting base means, support devices for engaging and supporting said cantilevered section carried on said sides and disposed above said mounting base means, retracting means responsive to portions of said rolling support adjacent to said other end of said rolling loop whose movement toward said moving end causes said retracting means to pivot said sides to their retracted positions and retract said support devices such that said rolling loop may pass through the retractable roller support means, and further comprising engaging means responsive to portions of said rolling support adjacent to said one end of said rolling loop whose movement away from the anchored end causes said engaging means to pivot said sides toward said cantilevered section to engage said support devices with said cantilevered section of said rolling support.

13. In a flexible rolling support as defined in claim 12, said retracting means including biasing means for urging said sides to their retracted positions.

14. In a flexible rolling support as defined in claim 13, said biasing means including a spring means.

15. In a reciprocal flexible rolling support having anchored and moving ends, a rolling loop joined at one end to the anchored end and at its other end to one end of a cantilevered section, the other end of which is joined to said moving end, the improvement comprising a retractable support means disposed in the path of movement of the rolling support for supporting said cantilevered section comprising a mounting base means, sides rising from said mounting base means on opposite sides of the rolling support and being pivoted on said mounting base means, support devices for engaging and supporting said cantilevered section carried on said sides and disposed above said mounting base means, retracting means including a torsion bar for urging said sides to their retracted positions, said retracting means being responsive to movement of said rolling loop toward said anchored end to pivot said sides to their retracted positions and retract said support devices such that said rolling loop may pass through the retractable roller support means, and engaging means responsive to movement of said rolling loop away from said anchored end toward said mounting base means to pivot said sides toward said cantilevered section to engage said support devices with said cantilevered section of said rolling support.

16. In a reciprocal flexible rolling support having anchored and moving ends, a rolling loop joined at one end to the anchored end and at its other end to one end of a cantilevered section, the other end of which is joined to said moving end, the improvement comprising a retractable support means disposed in the path of movement of the rolling support for supporting said cantilvevered section comprising a mounting base means, sides rising from said mounting base means on opposite sides of the rolling support and being pivoted on said mounting base means, support devices for engaging and supporting said cantilevered section carried on said sides and disposed above said mounting base means, retracting means responsive to movement of said rolling loop toward said anchored end to pivot said sides to their retracted positions and retract said support devices such that said rolling loop may pass through the retractable roller support means, and engaging means including a pair of oppositely extending return bars projecting inwardly of said sides and transverse to the path of movement of said rolling support, said engaging means being responsive to movement of said rolling loop away from said anchored end toward said mounting base means to pivot said sides toward said cantilevered section to engage said support devices with said cantilevered section of said rolling support.

17. In a flexible rolling support as defined in claim 16, said return bars being secured to said sides substantially at the bottoms of said sides and adjacent the level of the mounting base means, whereby the rolling support may engage and rest on said return bars to pivot said sides toward said cantilevered section to engage said support rollers with said cantilevered section of said rolling support.

* * * * *